April 30, 1968 L. C. CLARK, JR 3,380,905
ELECTROLYTIC SENSOR WITH ANODIC DEPOLARIZATION
Filed Oct. 11, 1963
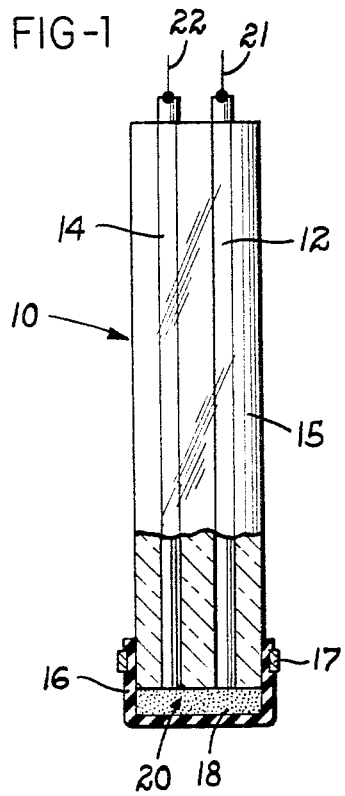
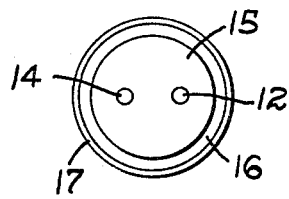
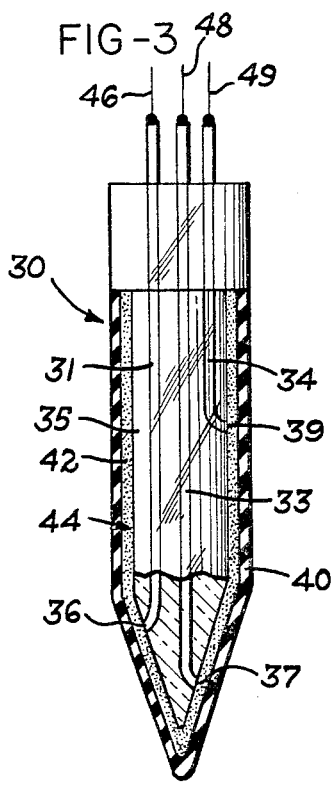
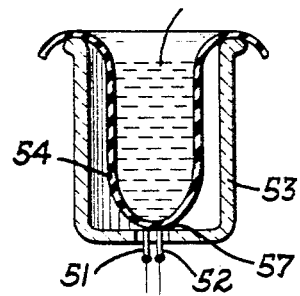
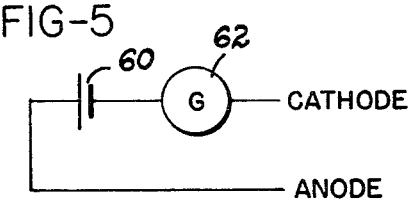
INVENTOR.
LELAND C. CLARK, JR.
BY
Marechal, Biebel, French & Bugg
ATTORNEYS United States Patent Office 3,380,905
Patented Apr. 30, 1968

3,380,905
ELECTROLYTIC SENSOR WITH ANODIC
DEPOLARIZATION
Leland C. Clark, Jr., 1312 Willoughby Road,
Birmingham, Ala. 35216
Filed Oct. 11, 1963, Ser. No. 315,461
15 Claims. (Cl. 204—195)

This invention relates to an electrochemical device and more particularly to an improved polarographic cell which is relatively simple in construction and operation.

In polarographic measurements it is common practice to use two electrodes, one of which, generally the cathode is polarized and does not allow current to flow until depolarized by the substance being measured. The other electrode generally the anode, is not polarizable and will therefore not restrict the flow of relatively large current. Of the pair, the polarized electrode is generally the sensor and the non-polarized electrode is often referred to as the reference electrode. Platinum and mercury have been used as the sensor electrode while silver chloride coated silver electrodes and saturated calomel electrodes have been used as the reference electrode. Very large mercury pools are useful reference electrodes, especially with dropping mercury electrodes, and function as reference electrodes under these circumstances because very large metallic surfaces generally do not become polarized.

The small non-polarizable reference electrodes can be used as the anode or positive poles but platinum, on the other hand cannot, because it is readily polarized in most common electrolytes, such as sodium and potassium chloride which do not depolarize platinum except at relatively high voltage differences between the electrodes.

There are certain disadvantages to using silver, calomel, or mercury as reference electrodes in polarographic devices where very small analytical cells or sensing probes are to be constructed. Calomel electrodes are difficult to construct because of the complex chemical chain required consisting of connections as follows: Wire-to-platinum-to mercury-to-calomel-to potassium chloride solution-to porous bridge-to-solution. Silver chloride coated silver electrodes are more easily constructed but silver chloride dissolves in electrolyte solutions and may eventually diffuse to the other electrode and change its character by plating or coating it. Large mercury pools are cumbersome to use and are a source of possible poisoning of biological systems.

In the construction and manufacture of the Clark oxygen electrode, disclosed in my earlier U.S. Patent 2,913,386 issued Nov. 17, 1959, silver is generally used and for most purposes is entirely satisfactory. However, it is difficult to seal silver in glass and therefore the electrode is usually in the form of a wire wound around a glass insulated cathode, or as a silver tube around a glass insulated cathode, or a wire looped near the tip of the cathode.

If platinum could be used as reference or anode electrode, it could be sealed in electrically insulating side by side relationship with the sensor or cathode, as for example by placing both electrodes in a glass tube. This would facilitate the manufacture of relatively small electrodes of various shapes, and would at the same time, eliminate silver as a source of contamination. Further it would make possible the construction of electrodes which could be operated for indefinite periods because platinum ions would not diffuse into the electrolyte and, even if they did, would be deposited on the other electrode as platinum rather than a dissimilar metal.

Platinum electrodes sealed in spaced electrically insulating relationship within a glass rod offer the advantages of excellent properties of glass, such as resistance to high temperature, sterilization, excellent electrical insulation, etc., although plastic materials such as polytetrafluoroethylene and other materials may also be used.

Since the Clark-type oxygen cathodes of the type described in the aforementioned patent are now made commercially where the wire electrode has a diameter of only 0.0005 inches it is possible in accordance with this invention to incorporate two very thin platinum electrodes in a glass tube having a total diameter of 0.005 inches or less, thereby providing a very thin and compact electrode structure which may be easily manufactured.

In accordance with the present invention, the electrodes making up or constituting the electrode pair are of the same material, preferably platinum, and are assembled in electrically insulating side-by-side relationship in a material such as glass or a suitable plastic. Forming a portion of the electrode structure is a membrane selectively permeable to the constituent to be measured, and in the case of oxygen the membrane may be of a material such as polyethylene which allows the passage of oxygen while forming a barrier to other substances which would affect the electrical characteristics of the cell. The membrane is so located with respect to the cell as to define a space between the electrode and the membrane, which space may be at least partially filled by an electrolyte which forms an electrical path between the electrodes. Since one of the electrodes functions as a sensor it will be depolarized by the particular constituent being analyzed or measured, while the reference electrode or anode is not polarized and therefore allows flow of current.

The electrolyte which occupies the small space above described includes at least in part a material which while performing its function as an electrolyte also performs the function of preventing polarization of the reference electrode and at the same time, does not operate to depolarize the sensor or cathode electrode.

According, it is a primary object of the present invention to provide a compact and relatively simple electrode structure for use in polarographic apparatus wherein the electrode members may be easily assembled within a supporting structure, and wherein the entire electrode structure is capable of having various shapes and sizes.

Another object of the present invention is to provide an electrode structure for use in polarographic analysis wherein both electrodes are of platinum and wherein at least a part of the electrolyte which forms the electrical path between the electrodes is composed of a material which depolarizes the electrode which functions as the reference electrode.

An additional object of this invention is to provide an apparatus including a polarographic cell having an anode and a cathode contcted by an electrolyte, and also having a membrane selectively permeable to the substance to be measured wherein the substance being measured operates to depolarize one of the electrodes, and wherein the electrolyte includes, at least in part, an electrolyte material or a reducing agent which prevents polarization of the other electrode whereby current will flow between the electrodes at least in the presence of a constituent being analyzed.

Other objects and advantages of the present invention will be apparent from the following description, the accompanying drawing and the appended claims.

In the drawing:

FIG. 1 is a view partly in section and partly in elevation of a cell according to the present invention;

FIG. 2 is an end view of the cell shown in FIG. 1;

FIG. 3 is a detailed view of a modified cell of the present invention;

FIG. 4 is a detailed view of still another modification of the cell of the present invention; and FIG. 5 is a diagram of a simple circuit for the cells of the type shown in FIGS. 1–4.

Referring to the drawing which illustrates a preferred embodiment of the present invention, a typical cell 10 is shown in FIGS. 1 and 2 as including two wires or electrodes 12 and 14 which are sealed in side by side electrically insulating relationship within a supporting member 15. The electrodes 12 and 14 terminate at the end of the supporting member, which is preferably of glass or other electrically insulating and preferably chemically inert material, and which may be ground flush with the electrodes.

The end of the supporting member 15 is covered by a permeable membrane 16 of polyethylene or other suitable material, and means in the form of a band 17 and provided to hold the membrane in spaced relation to the bottom of the electrode structure thus providing a space 18 between the membrane 16 and the electrodes, and it is understood that other constructions may be used which maintain the membrane spaced from the electrode ends. The membrane may also be formed of rubber, vinyl chloride and may be constructed to provide a barrier permeable only to desired substances by passing a thin film of selectively permeable fluid between relatively thin permeable plates or membranes. One such selectively permeable fluid may be a silicone oil.

Received within the space 18 is an electrolyte 20 which at least partially fills the space and which contacts each electrode 12 and 14 to provide an electrical path therebetween. The layer of electrolyte 20 is much thinner than shown and may be only as thick as a capillary film compressed between the membrane 16 and the end of the cell. The ends of the electrodes 12 and 14 are connected to two insulated wires 21 and 22, respectively which are connected to the source of applied voltage.

FIG. 2 is an end view of the electrode cell showing the ends of the electrodes 12 and 14 in the supporting member 15 and that part of the membrane 16 which is sealed or affixed to the supporting member. These electrodes may terminate in the same diameter as that sealed in the support 15 or may be increased or decreased in diameter at the point where they terminate in the end of the support member thus providing electrode surfaces of various sizes.

FIG. 3 shows a modified cell 30 which includes a plurality of electrodes 31, 33 and 34 so mounted in a support member 35 that the active electrode surfaces 36, 37 and 39 terminate along the edge of the supporting member 35 which is preferably pointed. A permeable membrane 40 is positioned over the support member to provide a space 42 between the outer surface of the support member, the exposed or active surface of the electrodes and the membrane 40. Received within this space is an electrolyte 44 which establishes an electrical path between all electrodes. Affixed to each electrode 31, 33 and 34 is a lead wire 46, 48 and 49 respectively which in turn are connected to a source of applied voltage.

This form of electrode cell construction allows the electrodes to be placed away from the point of pressure used in an electrode required for penetrating an object or tissue, and the electrodes may be so arranged that the active electrode surfaces are spaced along the length of the supporting member to allow measurement at several points in an object with a single probe. These electrodes may be so connected as to represented pairs, one functioning as an anode and one as a cathode, alternately or by different circuits.

FIG. 4 shows another construction in which electrode wires 51 and 52 are sealed in the bottom of a supporting member 53 in the form of a vessel. Inside the vessel there is placed a permeable plastic bag 54 filled with the solution 55 to be measured. Between the bottom of the plastic bag 54 and the bottom of the vessel 53 is placed a drop of electrolyte 57 which is compressed by the weight of fluid in the bag yet forms an electrically conductive layer between the membrane 54 and the bottom of the container 53 so that current can flow between electrodes 51 and 52. This design with electrodes of exactly controlled and non-varying surface, is possible because the anode and cathode can now be made of glass-sealable metals while the container 53 may be of glass and the like.

FIG. 5 represents basically the circuit for use with cells of this invention, and it includes a battery 60, a galvanometer 62 for measuring the current flow, and an anode and cathode. The battery impresses a voltage which may be set at any desired potential, for example, −0.6 volt for the measurement of oxygen using the conventional Clark electrode described in my earlier patent previously identified, and the galvanometer measures the current flow, which in the case of oxygen measurement, is proportional to the tension of the gas.

The operation of the cell of the present invention may be understood with reference to the following example. If the electrolyte is potassium chloride, both electrodes are of platinum, and a voltage of about 0.6 v. is applied, very little current will flow regardless of the amount of oxygen contacting the platinum surface of the cathode. The current is limited by the fact that the anode is polarized in the solution and cannot be depolarized by the potassium or chloride ions and this condition may be understood by referring to a system including a silver chloride coated silver cathode and a platinum anode system.

In the case of a cathode of silver chloride coated silver used as the reference electrode or cathode, and platinum used as the anode or sensor electrode, virtually no current will flow until the voltage at the anode reaches about 1.2 volts, both electrodes being in contact with a chloride solution, for example sodium or potassium chloride. At about 1.2 volts, current will flow and a slight further increase in voltage, for example 0.2 volts causes a substantial increase in current, and chlorine gas is given off at the platinum or anode surface due to a complex reaction which in essence amounts to two chloride ions combining with two electrons to produce one atom of chlorine. In the case of a bromide ion, the reaction is two bromide ions combining with two electrons to produce bromine, and this reaction proceeds at a somewhat lower voltage than the chloride reaction, for example, in the order of 0.8 volts with bromine being given off at the anode surface. In the case of iodine, the reaction takes place at about 0.4 volts apparently a mechanism which may simply be stated as two iodide ions plus two electrons to give iodine. In each of the preceding examples, the cation may be any soluble salt such as lithium, rubidium, or ammonium and essentially the same basic reactions take place.

If sodium phosphate were used instead of sodium chloride in the preceding example then the platinum anode would depolarize at about 1.3 volts, but at this point oxygen is given off at the anode similar to the classic electrolysis procedure for determining the constituents of water. The reason the platinum anode is polarized in sodium phosphate is that the phosphate radical with a minus 3 valence cannot depolarize it, nor can the hydroxyl ions from the water depolarize it. There is evidence that oxygen is given off at the surface of the platinum and becomes acid probably due to a reaction by which two hydroxyl ions combine with two electrons to give oxygen plus two hydrogen ions, and the net result is that the hydroxyl ions finally depolarize the anode.

Referring again to the examples with chloride, chloride compounds would seem to be operative except for the fact that for the oxygen reaction to occur in the negative terminal, voltages lower than 1.0 volts are necessary because the cathode is self-depolarizing in the absence of oxygen by the reaction of two hydrogen ions plus two electrons to give hydrogen. There is evidence that the platinum surface of the anode may become covered with platinum oxide, and in the double platinum electrode system of the present invention, depolarization may be of a platinum oxide anode rather than a platinum anode, although the evidence is not conclusive.

Accordingly, the present invention utilizes a double platinum electrode system, wherein the anode is depolarized by one or a combination of two mechanisms. The first is an electrochemical depolarization wherein an electrolyte is utilized which will depolarize the electrode at relatively low voltages, and the second mechanism is a chemical depolarization wherein the surface of the electrode is rendered conductive without necessarily applying any voltage thereto, for example, by use of a strong reducing agent which reacts with platinum oxide on the surface of the platinum anode to produce platinum and an oxidized product in a reaction in which platinum oxide plus a hydrogen donor gives platinum and water, the hydrogen donor preferably being a strong reducing agent having a general formula $RH_2$.

Platinum anodes are depolarized by a number of ions among which are ascorbic acid (Vitamin C), iso-ascorbic acid; iodide, ferrocyanide, thiocyanate ions, carbamylhydrazine, procaine, Adrenalin, hydroquinone, 3,4-dihydroxy phenol compounds, glutathione, cysteine, and alpha - naphthylamine. The latter compound like some other organic compounds is oxidized by the anode and deposits a coating on the anode which reduces the current flow to some extent.

Other electrolytes which operate satisfactorily are sulfa drugs such as sulfadiazine and those having the general formula

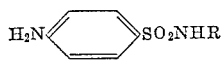

wherein R may be any constitutent and wherein there is a free amino group capable of oxidation. Aniline may also be used as a depolarizing electrolyte as well as phenothiazines of the general formula

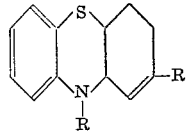

wherein the S atom is oxidized to an SO compound. Additionally, surfactants and detergents may also be utilized to depolarize the anode, and both of these types of compounds offer the advantage of helping to clean oxidizing products resulting from their depolarizing action. The detergents may be of the cationic or anionic type, and preferably those compounds which are compatible with electrolytes of the type previously described. The electrolytes described above may be used separately or in combination provided there is no adverse reaction between them.

The anode causes a chemical reaction to take place and at the same time is depolarized so that current may flow. Since there is no need to control exactly the amount of depolarization but only to insure that the anode is effectively depolarized a great excess of depolarizing chemical can be used for example an electrolyte or a reducing agent. Because of this it is possible, though not necessarily preferred, to use a large concentration of a substance which is not of the greatest stability. For example, one can employ a salt of ascorbic acid, such as sodium ascorbate, even though sodium ascorbate exposed to air, metals, and possibly heat, slowly decomposes. Use of purely organic sulfa compounds, such as sulfadiazine have certain advantages, such as the fact that they are chemically stable, and can sterilize or greatly retard bacteriological growths in the electrolyte but their solutions are not as good an electrical conductor as some of the other materials mentioned.

An electrolyte which has considerable merit and which is preferred in accordance with the present invention consists of a saturated solution of potassium iodide. The iodide is oxidized, allowing current flow, and hence is consumed in infinitesimal amounts compared to the total amount present. Neither the iodide, nor the product of the anodic oxidation, which may at least in part be molecular iodide or $I_2$, interferes with the operation of the cathode. Certain of the anodic oxidation products, such as $I_2$, having a certain vapor pressure, can, in fact diffuse out of the membrane. Potassium iodide as a dry salt or in solution is stable and hence a good electrolyte for general use.

The applied voltage needed when the Clark electrodes of my earlier patent are used to measure oxygen is in the range of 0.6 to 0.8 volts, when this cell uses a silver anode in a KCl solution. The voltage-amperage curve, or polarogram, for a platinum anode, depolarized with KI, is different from the usual platinum-silver curve so that in this case a lower voltage is required. Oxygen has been quantitatively measured with the double platinum cell of this invention and a near saturated solution of potassium iodide electrolyte at 0.4 v.

There are various optimum voltages for applying the best operable potential for measuring oxygen; these depend upon the concentration and type of depolarizing ion, the pH of the electrolyte solution in some instances, and other factors, but it is an easy matter to determine the best conditions for each electrolyte and to hold them constant once determined. Above the optimum voltage there is an increase in the residual current in the case of the Clark electrode of my earlier patent "no-oxygen current," and while this is easily compensated for electrically by setting this point on the galvanometer as "zero concentration," it is desirable to keep the residual current low.

Another characteristic that the electrolyte must have is that it must not be a cathode depolarizer for in this case both anode and cathode would be depolarized by the electrolyte and current flow would occur simply on the basis of the conductivity of the electrolyte used between the membrane and the end of the glass electrode cell. The electrolytes previously described are satisfactory while hydrogen peroxide may be cited as an example of an unsatisfactory electrolyte because it depolarizes both anode and cathode.

In operation the electrolyte provides for flow of electrons between the electrodes because of the electro-reduction and electro-oxidation process of polarography. In the case of oxygen determination, for example, the reduction and oxidation takes place in accordance with the equation two hydrogen ions plus an oxygen atom plus two electrons to yield water. The electrical characteristics of the cell will be varied in proportion to the quantity of substance to be measured and passing through the permeable membrane, and in the case of oxygen, for example, the current carrying capacity of the cell will vary in direct proportion to the quantity of oxygen passing into the electrolyte.

The electrode system of the present invention may also be used to measure other gases polarographically, for example, sulphur dioxide in the absence of oxygen, and detection of hydrogen, although not quantitatively. To detect hydrogen, the electrode is connected directly to a meter which records voltage. An applied polarizing voltage need not be used because the electrode pair generates a voltage due to an equilibrium reaction of two hydrogen ions and two electrons to form hydrogen, as would occur on a platinum surface and in the layer 20 filling the space 18. In order to generate an electrical signal, the surface of one platinum electrode is preferably covered with a thin layer of gold so that the reaction does not proceed on one surface, on the gold plated surface, but proceeds on the other. In this way, a voltage difference is produced between the two electrodes in the presence of hydrogen, and the response is curvilinear, providing a relatively high voltage of about 0.4 volt in the presence of small concentrations of hydrogen, for example about 1%, and up to about 0.6 volts at 100% hydrogen concentration. The maximum voltage generated in the presence of hydrogen is a function of the pH of the electrolyte and the concentration of oxygen present in the gas being measured may be used to control the pH.

Although the voltage generated is not a quantitative function of the concentration of hydrogen, an electrical signal is generated in the presence of hydrogen and it could thus be used to activate a warning system, indicating the presence of hydrogen.

In the precise measurement of gases utilizing the electrode system of the present invention, the temperature of the electrode is preferably maintained at constant known temperature, and a calibration curve is preferably made relating known gas concentrations or tensions to an electrical measurement at various gas temperatures. Alternatively, the detection circuit may include an electrical compensation means to take care of the effect of temperature, and this may be done for example by the use of thermistors and the like.

The cell according to this invention may be used in various ways because of its relatively small size and may be used to analyze constituents of a liquid, solid or gas. In determining solids or salts in the solution, the permeable membrane may be arranged so as to be permeable only to certain ions as for example utilizing a membrane of an ion exchange resin. Because of the simplicity of construction attributable primarily to the fact that the electrodes are of the same material and easily sealable in glass, the cell of the present invention may be used with corrosive liquids providing the liquids do not otherwise react with the exposed surface of the electrodes. Since the electrodes are preferably of platinum which metal is relatively inert to most chemicals, the cell has a wider range of uses than the silver/silver chloride coated silver cells of the prior art.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A cell for use in polarographic analysis comprising the combination of:
    an anode and a cathode electrode,
    means for maintaining said electrodes in spaced relationship,
    membrane means selectively permeable to the constituent to be measured,
    means mounting said membrane in spaced relationship to said electrodes to define a space between said electrodes and said membrane,
    each of said electrodes including an active surface positioned on the same side of said membrane and exposed to the constituent to be measured as the latter passes through said membrane,
    said anode being of a material which is polarizable in the presence of an electrolyte,
    an electrolyte in at least a portion of said space contacting each electrode for forming an electrical path therebetween, said electrolyte including a material which is ineffective to depolarize said cathode electrode and capable of depolarizing said anode electrode at a relatively low voltage, and said cathode electrode being depolarized by said constituent being measured.

2. A cell as set forth in claim 1 wherein said anode and cathode are of the same material.

3. A cell as set forth in claim 1 in which said anode and cathode are of platinum.

4. A cell as set forth in claim 1 in which said material in said electrolyte is an oxidizable material capable of releasing electrons at a relatively low voltage.

5. A cell as set forth in claim 1 in which said material in said electrolyte is a material capable of being oxidized by said anode electrode.

6. A cell for polarographic analysis comprising in combination:
    an anode and a cathode electrode,
    means for maintaining said electrodes in spaced electrically insulating relationship,
    membrane means selectively permeable to the constituent to be measured,
    means mounting said membrane is spaced relationship to said electrodes to define a space between said electrodes and said membrane, said anode being of a material which is polarizable in the presence of an electrolyte,
    an electrolyte in at least a portion of said space contacting each electrode for forming an electrical path therebetween,
    each of said electrodes including an active surface positioned on the same side of said membrane and exposed to the constituent to be measured as the latter passes through said membrane,
    said electrolyte including at least in part a material selected from the group consisting of surfactant, ascorbic acid, iso-ascorbic acid, carbamyl hydrazine; iodide, ferrocyanide and thiocyanate compounds, sodium ascorbate, sulfadiazine, aniline, procaine, adrenalin, hydroquinone, 3,4 - dihydroxylphenol compounds, glutathione, cysteine, alphanaphthylamine, sulfa drugs having the general formula

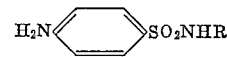

where R may be any constituent, and wherein there is a free amino group, and phenothiazines having the general formula

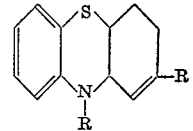

wherein the S atom is oxidized to an SO compound, and said material being ineffective to depolarize said cathode.

7. A cell as set forth in claim 6 wherein said surfactant is selected from the group of cationic and anionic detergents.

8. A cell for polarographic analysis comprising in combination:
    an anode and a cathode electrode,
    means for maintaining said electrodes in spaced electrically insulating relationship,
    membrane means selectively permeable to the constituent being measured,
    means mounting said membrane is spaced relation to said electrodes to define a space between said electrodes and said membrane, said anode being of a material which is polarizable in the presence of an electrolyte,
    an electrolyte is at least a portion of said space contacting each electrode for forming an electrical path therebetween,
    each of said electrodes including an active surface positioned on the same side of said membrane and exposed to the constituent to be measured as the latter passes through said membrane,
    said electrolyte including at least in part a substance capable of chemically depolarizing said anode,
    and said substance being ineffective to depolarize said cathode.

9. A cell for polarographic analysis comprising the combination of:
    a plurality of electrodes including an anode and a cathode,
    support means for maintaining said electrodes in spaced electrically insulating relationship, each said electrode including a portion thereof defining an active electrode surface, membrane means selectively permeable to the constituent to be measured, means mounting said membrane in spaced relationship to the active surface of said electrodes to define a space between said active electrode surfaces and said membrane, the said active electrode surface of each electrode being positioned on the same side of said membrane and exposed to the constituent to be measured as the latter passes through said membrane, said anode being of a material which is polarizable in the presence of potassium chloride, and an electrolyte in at least a portion of said space contacting each active electrode surface for forming an electrical path therebetween, said electrolyte comprising as an essential ingredient a material which is ineffective to depolarize said cathode electrode and capable of depolarizing said anode at a relatively low voltage, and said cathode being depolarized by said constituent being measured.

10. A cell as set forth in claim 9 wherein said support means includes a pointed portion at the end thereof adjacent said active electrode surfaces.

11. A cell for polarographic analysis comprising the combination of:
a platinum anode and a platinum cathode electrode,
a glass supporting member substantially completely encapsulating said electrodes and maintaining said electrodes in spaced electrically insulating relationship,
a portion of each electrode being exposed to define an active electrode surface,
membrane means selectively permeable to the constituent to be measured,
means mounting said membrane in spaced relationship to said active electrode surfaces to define a space between said electrode surfaces and said membrane,
the said active electrode surfaces of each electrode being positioned on the same side of said membrane and exposed to the constituent to be measured as the latter passes through said membrane,
said anode being polarizable in the presence of potassium chloride,
and a potassium iodide electrolyte in at least a portion of said space contacting each active electrode surface for forming an electrical path therebetween and for releasing electrons for depolarizing said anode and said cathode being depolarized by said constituent being measured.

12. A cell as set forth in claim 11 in which the active electrode surface of said cathode is different in surface area from the surface area of said anode.

13. A cell as set forth in claim 11 in which one of said active electrode surfaces terminates in a plane different from the other.

14. In a measuring cell for determining the quantity of a particular constituent to be measured, the combination of:
an anode and a cathode electrode,
support means for maintaining said electrodes in spaced electrically insulating relationship,
each of said electrodes including a portion thereof defining an active electrode surface,
membrane means selectively permeable to the constituent to be measured,
means mounting said membrane in spaced relationship to the active surfaces of electrodes to define a space between said active electrode surfaces and said membrane,
the said active electrode surface of each said electrode being positioned on the same side of said membrane and exposed to the constituent to be measured as the latter passes through said membrane,
said anode being of a material which is polarizable in the presence of potassium chloride,
an electrolyte in at least a portion of said space contacting each active electrode surface for forming an electrical path therebetween, said electrolyte including an oxidizable material ineffective to depolarize said cathode and capable of releasing electrons for depolarizing said anode, said cathode being depolarized by said constituent being measured, and
means coupled to said electrodes for impressing a predetermined electrical potential across said electrodes and indicating the variations in electrical current characteristics of the cell as a function of the quantity of the particular substance to be measured.

15. A cell for polarographic determination of hydrogen comprising the combination of:
a platinum anode and a platinum cathode electrode,
one of said electrodes including a layer of gold thereon,
a glass supporting member substantially completely encapsulating said electrodes and maintaining said electrodes in spaced electrically insulating relationship,
a portion of each electrode being exposed to define an active electrode surface,
membrane means selectively permeable to hydrogen,
means mounting said membrane in spaced relationship to said active electrode surfaces to define a space between said electrode surfaces and said membrane,
said anode being polarizable in the presence of potassium chloride,
and an electrolyte in at least a portion of said space contacting each active electrode surface for forming an electrical path therebetween and for releasing electrons for depolarizing said anode and being ineffective to depolarize said cathode, and said cathode being depolarized by said constituent being measured.

References Cited

UNITED STATES PATENTS

| | | | |
|---|---|---|---|
| 2,851,655 | 9/1958 | Haddad | 204—195 |
| 3,038,848 | 6/1962 | Brewer et al. | 204—195 |
| 3,070,539 | 12/1962 | Arthur et al. | 204—195 |
| 3,071,530 | 1/1963 | Neville | 204—195 |
| 3,088,905 | 5/1963 | Glover | 204—195 |
| 3,098,813 | 7/1963 | Beebe et al. | 204—195 |
| 3,196,100 | 7/1965 | Digby | 204—195 |
| 3,211,638 | 10/1965 | Halvorsen | 204—195 |
| 3,236,759 | 2/1966 | Robinson | 204—195 |
| 3,260,656 | 7/1966 | Ross | 204—195 |
| 3,272,725 | 9/1966 | Garst | 204—195 |

OTHER REFERENCES

Kaplan et al.: "American Journal of Cardiology," November 1961, pp. 659–663.

HOWARD S. WILLIAMS, *Primary Examiner.*

JOHN H. MACK, *Examiner.*

T. H. TUNG, *Assistant Examiner.*